(12) United States Patent
Koh

(10) Patent No.: US 9,231,236 B2
(45) Date of Patent: Jan. 5, 2016

(54) BATTERY PACK

(75) Inventor: Seok Koh, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 891 days.

(21) Appl. No.: 13/300,186

(22) Filed: Nov. 18, 2011

(65) Prior Publication Data

US 2012/0208078 A1    Aug. 16, 2012

(30) Foreign Application Priority Data

Feb. 10, 2011    (KR) .................. 10-2011-0011868

(51) Int. Cl.
*H01M 2/10* (2006.01)
*H01M 2/04* (2006.01)
*H01M 2/02* (2006.01)

(52) U.S. Cl.
CPC .......... *H01M 2/1094* (2013.01); *H01M 2/0277* (2013.01); *H01M 2/0285* (2013.01); *H01M 2/02* (2013.01); *H01M 2/026* (2013.01); *H01M 2/0207* (2013.01); *H01M 2/0217* (2013.01); *H01M 2/04* (2013.01)

(58) Field of Classification Search
None
See application file for complete search history.

(56) References Cited

U.S. PATENT DOCUMENTS

| 6,225,778 | B1 | 5/2001 | Hayama et al. | |
| 7,879,481 | B2* | 2/2011 | Takeshita et al. | 429/99 |
| 7,964,302 | B2* | 6/2011 | Ha et al. | 429/142 |
| 2006/0176014 | A1 | 8/2006 | Moon | |
| 2006/0199075 | A1 | 9/2006 | Moon et al. | |
| 2006/0266542 | A1 | 11/2006 | Yoon | |
| 2008/0081254 | A1 | 4/2008 | Kim et al. | |
| 2010/0040942 | A1 | 2/2010 | Hatta et al. | |
| 2010/0209768 | A1* | 8/2010 | Ahn et al. | 429/185 |
| 2011/0143193 | A1* | 6/2011 | Ahn | 429/176 |

FOREIGN PATENT DOCUMENTS

| JP | 2003-272569 A | 9/2003 |
| KR | 1020010015359 | 2/2001 |
| KR | 10-2006-0065385 | 6/2006 |
| KR | 10-2008-0029287 A | 4/2008 |
| KR | 10-0877816 | 1/2009 |

OTHER PUBLICATIONS

Korean Office Action dated Jul. 1, 2013 in corresponding Korean Patent Application No. 10-2011-0011868, and Request for Entry of the Accompanying Office Action attached herewith.

* cited by examiner

*Primary Examiner* — Edu E Enin-Okut
*Assistant Examiner* — Carmen Lyles-Irving
(74) *Attorney, Agent, or Firm* — Robert E. Bushnell, Esq.

(57) ABSTRACT

A battery pack including an external case having improved strength to protect a bare cell is provided. The battery pack includes a bare cell, a cover plate attached to one of long side surfaces that are widest planes of the bare cell, and an external case including a resin portion and a reinforcement plate and accommodating both the bare cell and the cover plate, wherein the resin portion surrounds sides of the reinforcement plate.

16 Claims, 12 Drawing Sheets

BATTERY PACK

CLAIM OF PRIORITY

This application makes reference to, incorporates the same herein, and claims all benefits accruing under 35 U.S.C. §119 from an application earlier filed in the Korean Intellectual Property Office on the 10 Feb. 2011 and there duly assigned Serial No. 10-2011-0011868.

BACKGROUND OF THE INVENTION

1. Field of the Invention

Aspects of the present invention relate to a battery pack.

2. Description of the Related Art

In general, a battery pack includes a bare cell formed by accommodating an electrode assembly in an insulating case, and an external case accommodating the bare cell. In order to protect the bare cell, an external case having improved strength is highly required.

BRIEF SUMMARY OF THE INVENTION

Aspects of the present invention provide a battery pack including an external case having improved strength to protect a bare cell.

In accordance with one aspect of the present invention, there is provided a battery pack including a bare cell, a cover plate attached to one of long side surfaces that are widest planes of the bare cell, and an external case including a resin portion and a reinforcement plate and accommodating the bare cell, wherein the resin portion surrounds sides of the reinforcement plate.

The cover plate and the bare cell may be combined with each other to a double sided tape.

The cover plate may be made of a metal.

The cover plate may include a first cover portion covering one long side surface of the bare cell exposed to a top opening of the external case, a second cover portion covering a bottom surface of the bare cell, a third cover portion covering one short side surface of the bare cell, and a fourth cover portion covering the other short side surface of the bare cell and facing the one short side surface of the bare cell.

The second cover portion, the third cover portion and the fourth cover portion of the cover plate may be formed inside the external case.

The reinforcement plate and the bare cell may be combined with each other using a double sided tape.

The reinforcement plate may be made of a metal.

The reinforcement plate may include a first plate covering the other long side surface facing the one long side surface of the bare cell, a second plate covering a top surface of the bare cell, a third plate covering the bottom surface of the bare cell, a fourth plate covering the one short side surface of the bare cell, and a fifth plate covering the other short side surface of the bare cell facing the one short side surface of the bare cell.

The resin portion may include a first resin portion surrounding the second plate, a second resin portion surrounding the third plate, a third resin portion surrounding the fourth plate, and a fourth resin portion surrounding the fifth plate, wherein the first plate is exposed to the outside of the resin portion.

The bare cell may include an electrode assembly and an insulating case accommodating the electrode assembly, the electrode assembly may include a positive electrode tab and a negative electrode tab, and the first resin portion may include a positive electrode tab groove and a negative electrode tab groove formed to be spaced apart from each other lengthwise to allow the positive electrode tab and the negative electrode tab to be drawn out to the outside of the external case.

The bare cell may include an electrode assembly including a positive electrode tab and a negative electrode tab, the insulating case includes a first extending portion from which the positive electrode tab and the negative electrode tab are drawn out, a height of the first resin portion is smaller than heights of the second resin portion, the third resin portion and the fourth resin portion, and the positive electrode tab and the negative electrode tab are drawn out to a space formed between the first extending portion and a top end of the first resin portion.

The first cover portion may be coplanar with a top surface of the resin portion.

As described above, in the battery pack according to one aspect of the invention, the strength of an external case accommodating a bare cell can be improved.

In the battery pack according to another aspect of the invention, the assembling process of the battery pack is simplified, thereby improving the manufacturability.

Additional aspects and/or advantages of the invention will be set forth in part in the description which follows and, in part, will be obvious from the description, or may be learned by practice of the invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, embodiments of the present invention will be described in detail with reference to the accompanying drawings.

First, a battery pack according to an embodiment of the present invention will be described with reference to FIGS. 1 to 6D.

Figure 1:
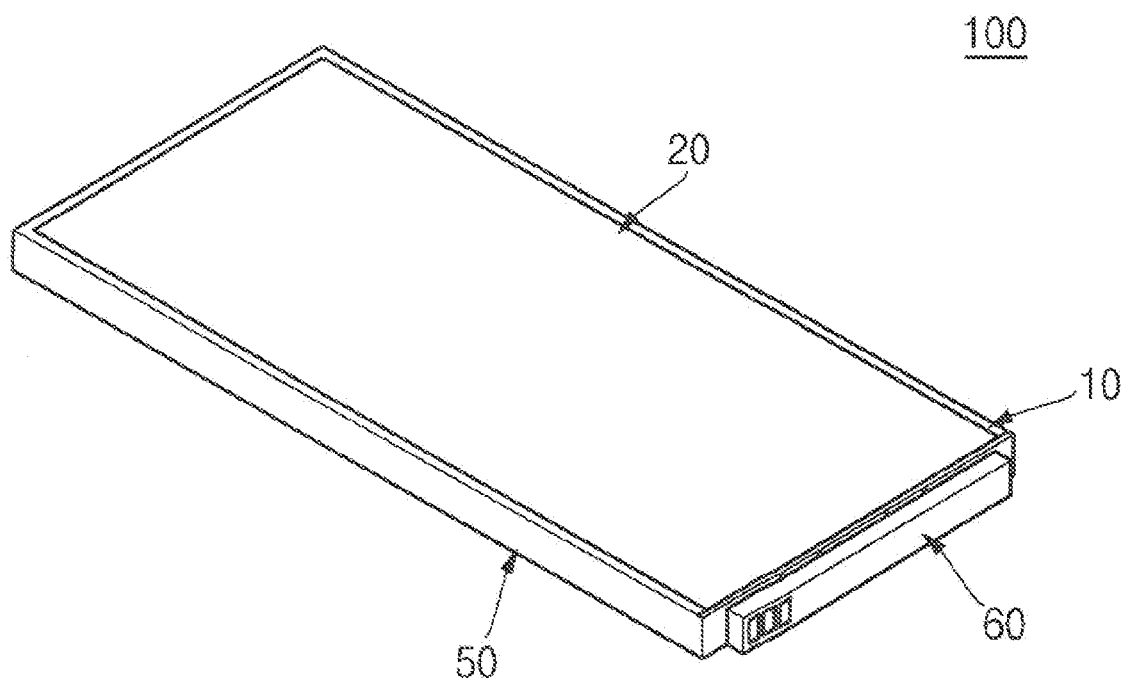
FIG. 1 is a perspective view of a battery pack according to an embodiment of the present invention.

FIG. 1 is a perspective view of a battery pack according to an embodiment of the present invention. Referring to FIG. 1, the battery pack 100 according to the embodiment of the present invention includes a bare cell 10, a cover plate 20 attached to the bare cell 10, an external case 50 accommodating the bare cell 10, and a protective circuit module (PCM) 60 attached to the external case 50.

Figure 2A:
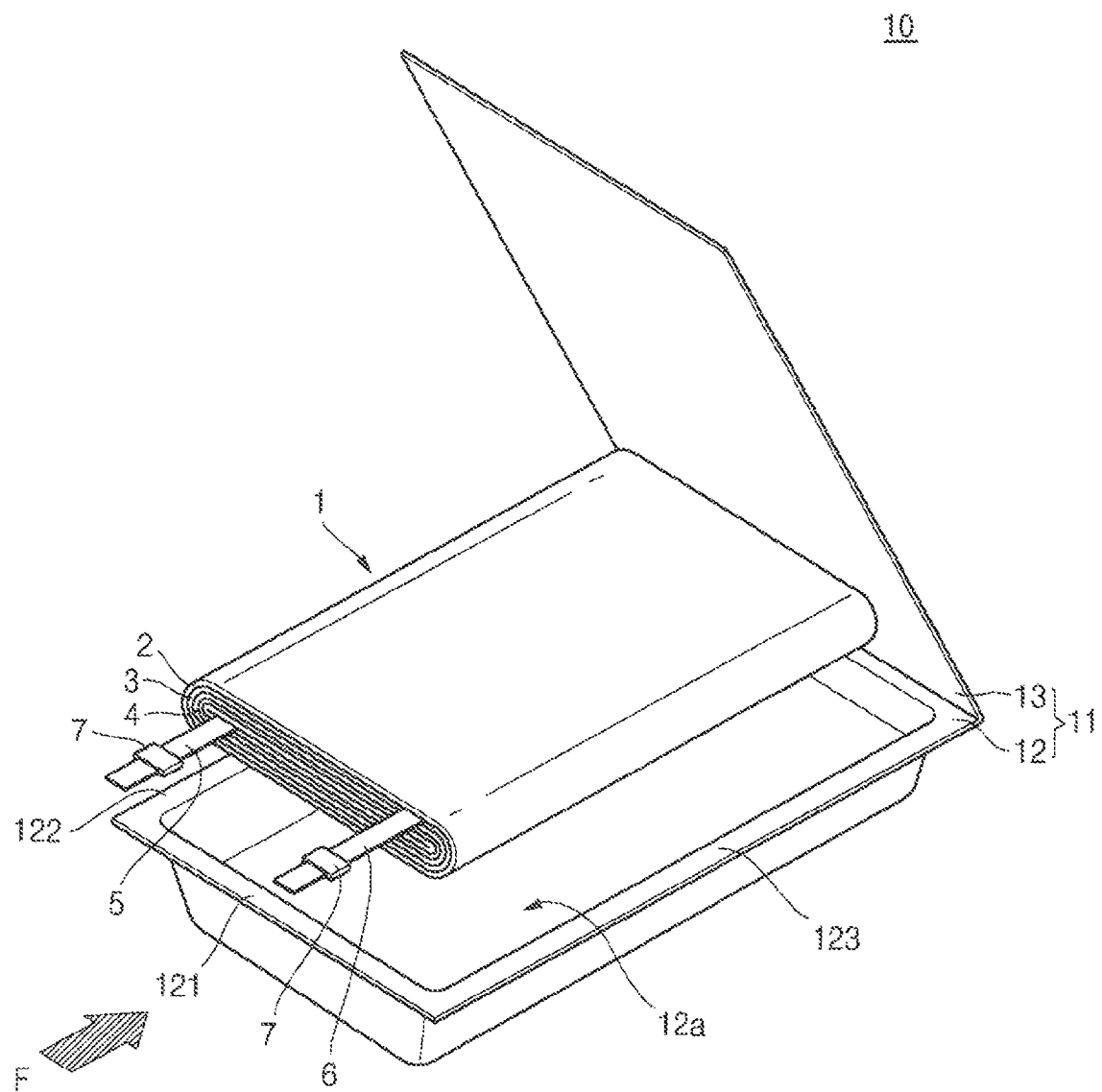
FIG. 2A is an exploded perspective view of a bare cell of the battery pack shown in FIG. 1.

FIG. 2A is an exploded perspective view of a bare cell of the battery pack shown in FIG. 1. Referring to FIG. 2A, the bare cell 10 includes an electrode assembly 1, and an insulating case 11 accommodating the electrode assembly 1.

The electrode assembly 1 includes a positive electrode plate 2 having both surfaces coated with a positive electrode active material, a negative electrode plate 4 having both surfaces coated with a negative electrode active material, and a separator 3 interposed between the positive electrode plate 2 and the negative electrode plate 4. In addition, a positive electrode tab 5 protruding a predetermined length and serving as a positive electrode is welded to the positive electrode plate 2. In addition, a negative electrode tab 6 protruding a predetermined length and serving as a negative electrode is welded to the negative electrode plate 4. Further, an insulation tape 7 for preventing short-circuits between each of the positive electrode tab 5 and the negative electrode tab 6 and the insulating case 11 may be provided. The positive electrode tab 5 and the negative electrode tab 6 are drawn out to the outside of the insulating case 11 and are electrically connected to the PCM 60.

The insulating case 11 is folded at its center and is divided into a lower case 12 and an upper case 13. The lower case 12 has a receiving part 12a formed by pressing to receive the electrode assembly 1. In addition, the lower case 12 includes a first extending portion 121, a second extending portion 122 and a third extending portion 123, which extend from edges of the receiving part 12a outwardly with respect to the insulating case 11. The extending portions 121, 122 and 123 are sealed with the edge of the upper case 13 after the electrode assembly 1 is accommodated in the receiving part 12a. in this case, the first extending portion 121 serves as a path through which the electrode tabs 5 and 6 are drawn out to the outside of the insulating case 11.

Figure 2B:
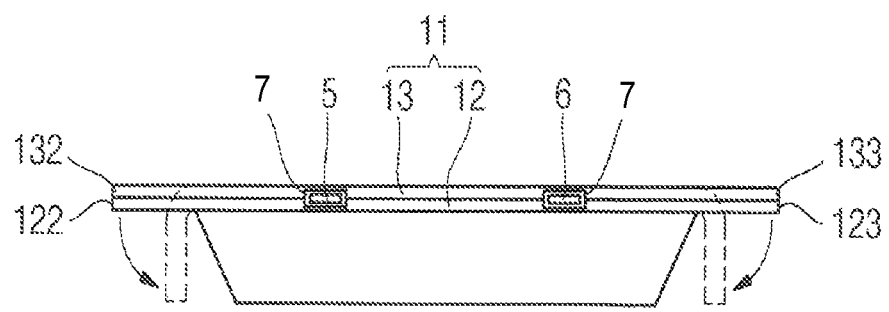
FIG. 2B illustrates a completed state of the bare cell shown in FIG. 2A, viewed in an 'F' direction.

FIG. 2B illustrates a completed state of the bare cell shown in FIG. 2A, viewed in an 'F' direction shown in FIG. 2A.

Referring to FIG. 2B, an upper case of the insulating case 11 is welded and sealed with the extending portions 121, 122 and 123 and the second extending portion 122 and the third extending portion 123 are then bent toward the receiving part 12a, i.e., in a direction indicated by an arrow, thereby forming the short side surfaces 132 and 133 of the bare cell 10.

In the present invention, for convenience of explanation, a surface of the bare cell 10 from which the electrode tabs 5 and 6 are drawn out is referred to as a top surface, and a surface opposite to and facing the top surface is referred to as a bottom surface. In addition, a surface connecting one lengthwise short ends of the top surface and the bottom surface is referred to as a first short side surface, and a surface connecting the other lengthwise short ends of the top surface and the bottom surface is referred to as a second short side surface. In addition, a widest surface connecting one thicknesswise short ends of the top surface and the bottom surface, that is, a top surface of the upper case 13, is referred to as a first long side surface, and a widest surface connecting the other thicknesswise short ends of the top surface and the bottom surface, that is, a bottom surface of the lower case 12, is referred to as a second long side surface.

Figure 3:
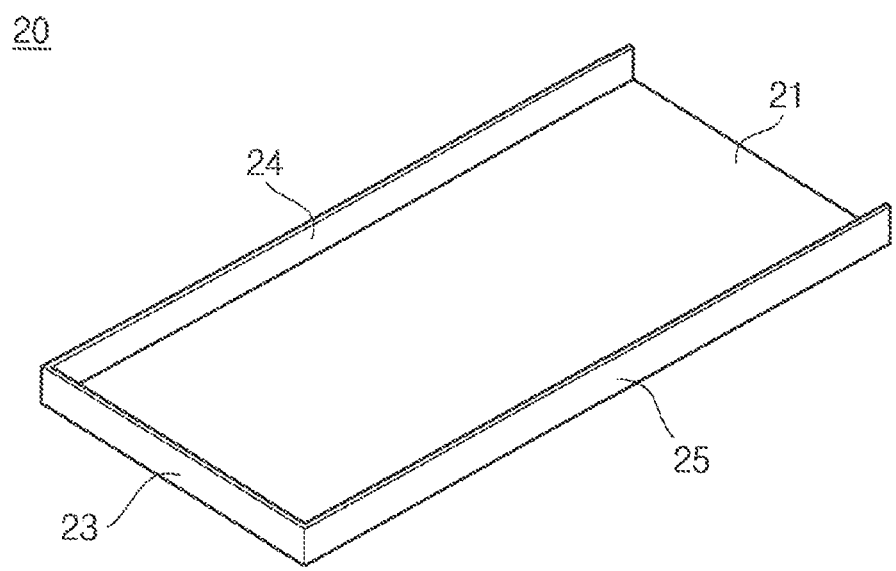
FIG. 3 is a perspective view illustrating an inner surface of a cover plate of the battery pack shown in FIG. 1.
Figure 4:
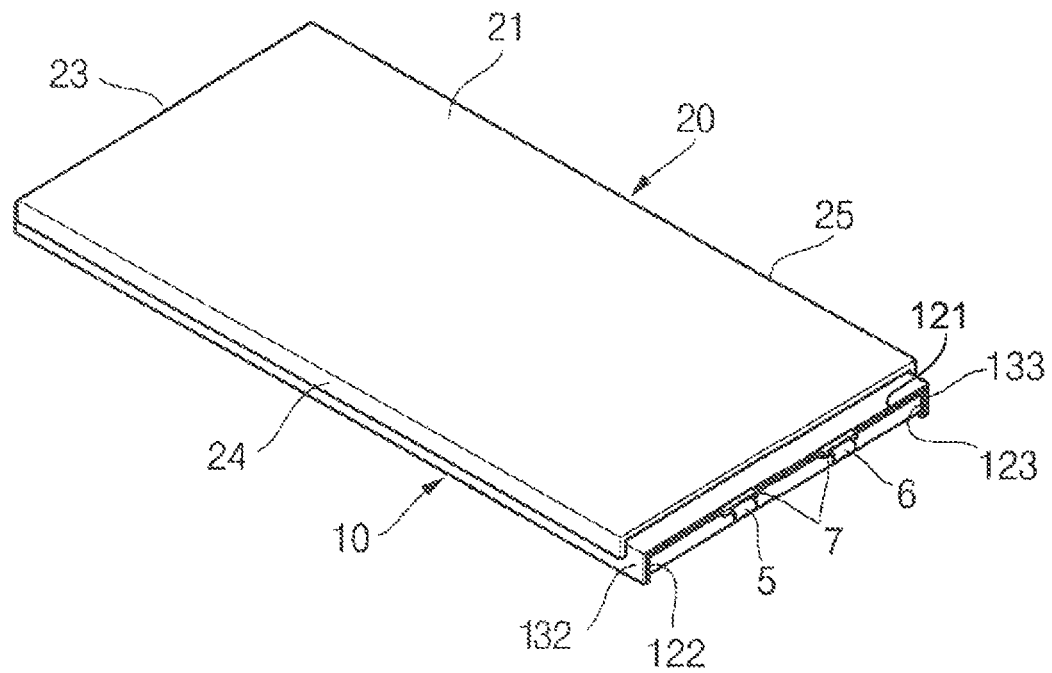
FIG. 4 is a perspective view illustrating a state in which a cover plate and a bare cell of the battery pack shown in FIG. 1 are assembled.

FIG. 3 is a perspective view illustrating an inner surface of a cover plate of the battery pack shown in FIG. 1, and FIG. 4 is a perspective view illustrating a state in which a cover plate and a bare cell of the battery pack shown in FIG. 1 are assembled.

Referring to FIG. 3, the cover plate 20 includes a first cover portion 21 forming a long side surface (a wide planer surface) of the battery pack 100, and a second cover portion 23, a third cover portion 24 and a fourth cover portion 25 forming sidewalls vertically extending from edges of the first cover portion 21.

Referring to FIG. 4, the cover plate 20 is attached to the bare cell 10. That is to say, the first cover portion 21 is attached to the first long side surface of the bare cell 10. In addition, the second cover portion 23, the third cover portion 24 and the fourth cover portion 25 may be attached to the bottom surface, the first short side surface and the second short side surface of the bare cell 10, respectively. The cover plate 20 and the bare cell 10 may be combined with each other using a double sided tape (not shown). In addition, since the cover plate 20 is attached to the bare cell 10 to reinforce strength of the bare cell 10, it may be made of a metal. Examples of the useful metal may be stainless steel.

Figure 5:
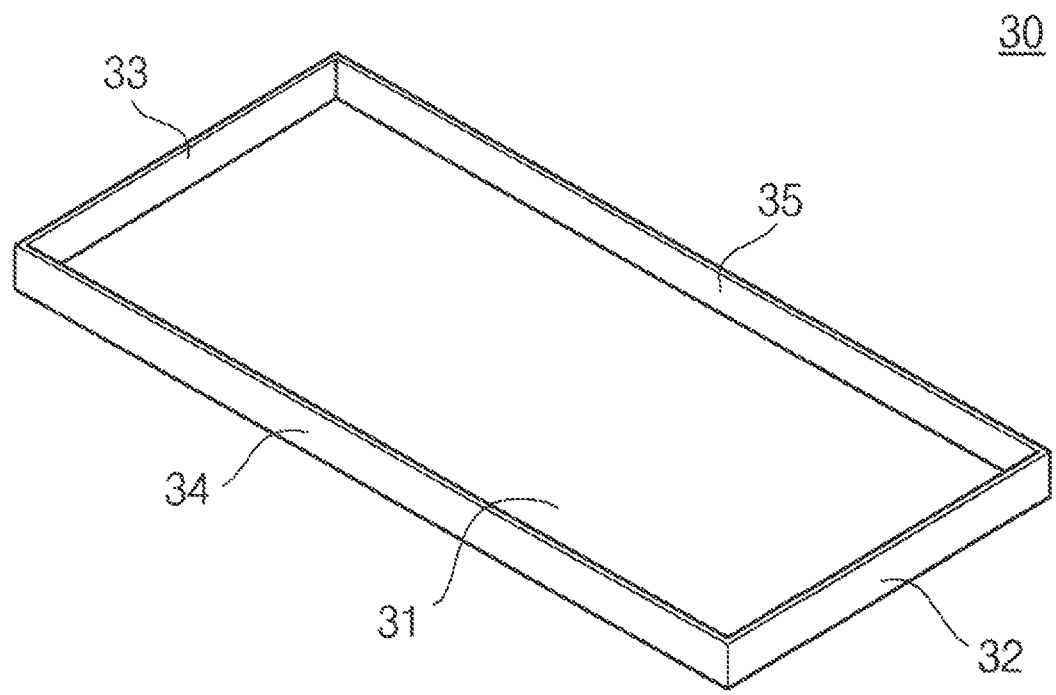
FIG. 5 is a perspective view illustrating an inner surface of a reinforcement plate of the battery pack shown in FIG. 1.
Figure 6A:
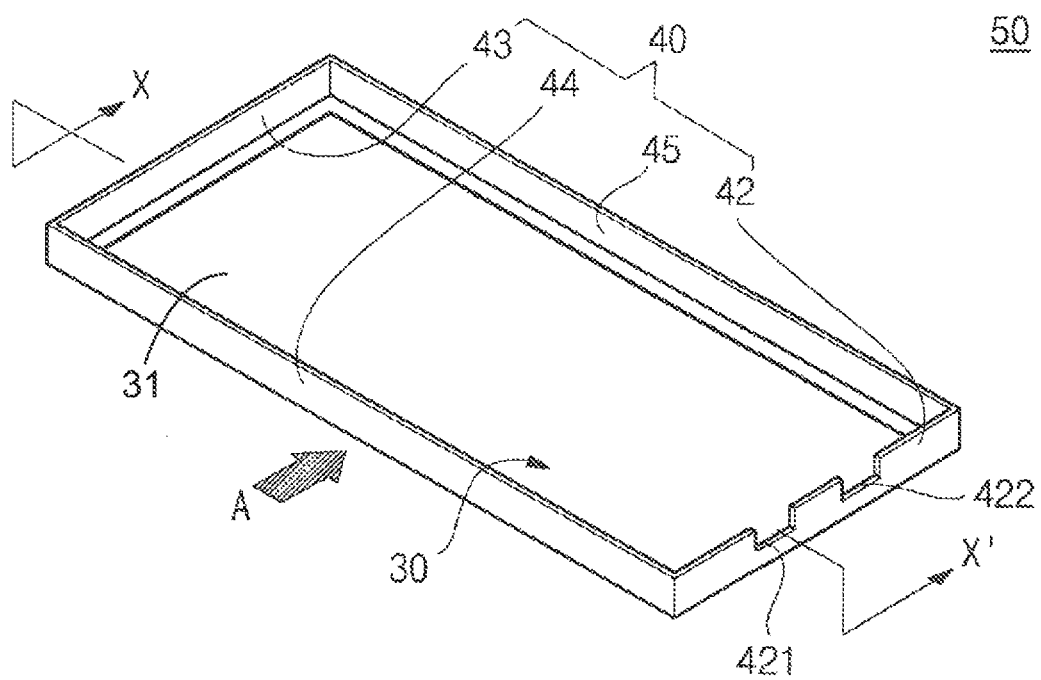
FIG. 6A is a perspective view illustrating an inner surface of an external case of the battery pack shown in FIG. 1.
Figure 6B:
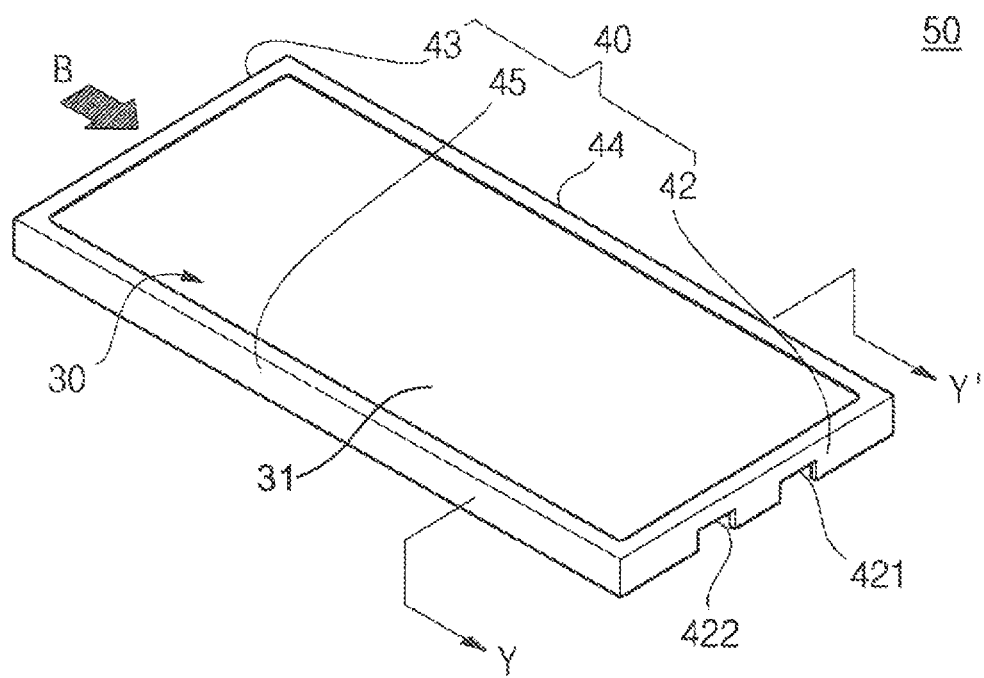
FIG. 6B is a bottom perspective view illustrating an outer surface of an external case of the battery pack shown in FIG. 6A.

FIG. 5 is a perspective view illustrating an inner surface of a reinforcement plate of the battery pack shown in FIG. 1. FIG. 6A is a perspective view illustrating an inner surface of an external case shown in FIG. 1, FIG. 6B is a bottom perspective view illustrating an outer surface of an external case shown in FIG. 6A, FIG. 6C is a cross-sectional view taken along the line X-X' of FIG. 6A, viewed in an 'A' direction, and FIG. 6D is a cross-sectional view taken along the line Y-Y' of FIG. 6B, viewed in an 'B' direction.

Figure 6C:
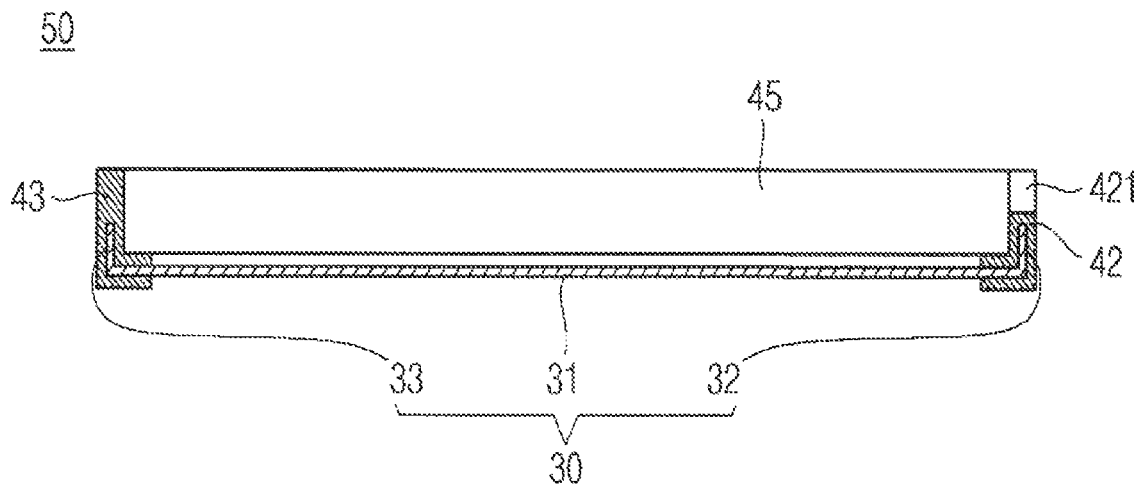
FIG. 6C is a cross-sectional view taken along the line X-X' of FIG. 6A, viewed in an 'A' direction.
Figure 6D:
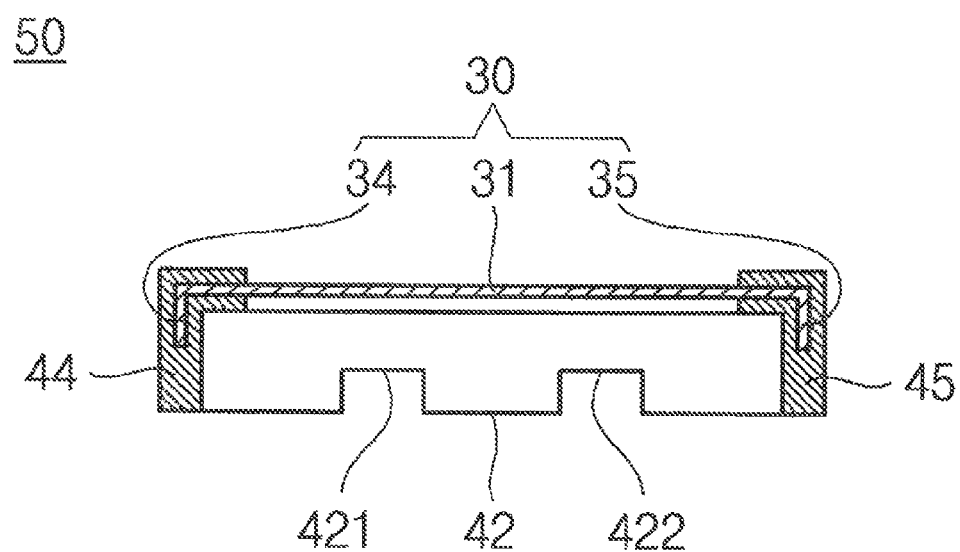
FIG. 6D is a cross-sectional view taken along the line Y-Y' of FIG. 6B, viewed in an 'B' direction.

Referring to FIGS. 5 to 6D, the external case 50 includes a reinforcement plate 30 and a resin portion 40 surrounding the reinforcement plate 30.

Referring to FIG. 5, the reinforcement plate 30 has a substantially rectangular parallelpiped shape having a top opening of a thicknesswise direction. In addition, the reinforcement plate 30 includes a first plate 31, a second plate 32, a third plate 33, a fourth plate 34 an a fifth plate 35. The first plate 31 forms a long side surface (a wide planer surface) of the battery pack 100. The second plate 32 and the third plate 33 extend from edges of the first plate 31 to be perpendicular to the first plate 31. The fourth plate 34 and the fifth plate 35 extend from opposing long sides of the edges of the first plate 31 to be perpendicular to the first plate 31. That is, second plate 32, third plate 33, fourth plate 34 an fifth plate 35 form sidewalls extending vertically from first plate 31. In addition, since the reinforcement plate 30 reinforces the strength of the external case 50 of the bare cell 10, it may be made of a metal. Examples of the useful metal may be stainless steel.

Referring to FIGS. 5, and 6A to 6D, the resin portion 40 includes a first resin portion 42, a second resin portion 43, a third resin portion 44 and a fourth resin portion 45 for surrounding second plate 32, third plate 33, fourth plate 34 and a fifth plate 35 of the reinforcement plate 30. The first resin portion 42, second resin portion 43, third resin portion 44 and fourth resin portion 45 forming sidewalls of the external case 50. In addition, the resin portion 40 is formed by insert molding the reinforcement plate 30 using a resin. In order to minimize a thickness of the battery pack 100, the first plate 31 may not be fully enclosed by the resin portion 40, as shown in FIGS. 6C and 6D. In addition, the first resin portion 42 includes a positive electrode tab groove 421 and a negative electrode tab groove 422 formed at a thicknesswise top end. The positive electrode tab groove 421 and the negative electrode tab groove 422 allow the positive electrode tab 5 and the negative electrode tab 6 to be drawn out from the electrode assembly 1 to the outside of the external case 50.

Next, an assembled structure of the bare cell 10 and the cover plate 20 and a coupling relationship and operation of the external case 50 will be described with reference to FIGS. 7A to 7C.

Figure 7A:
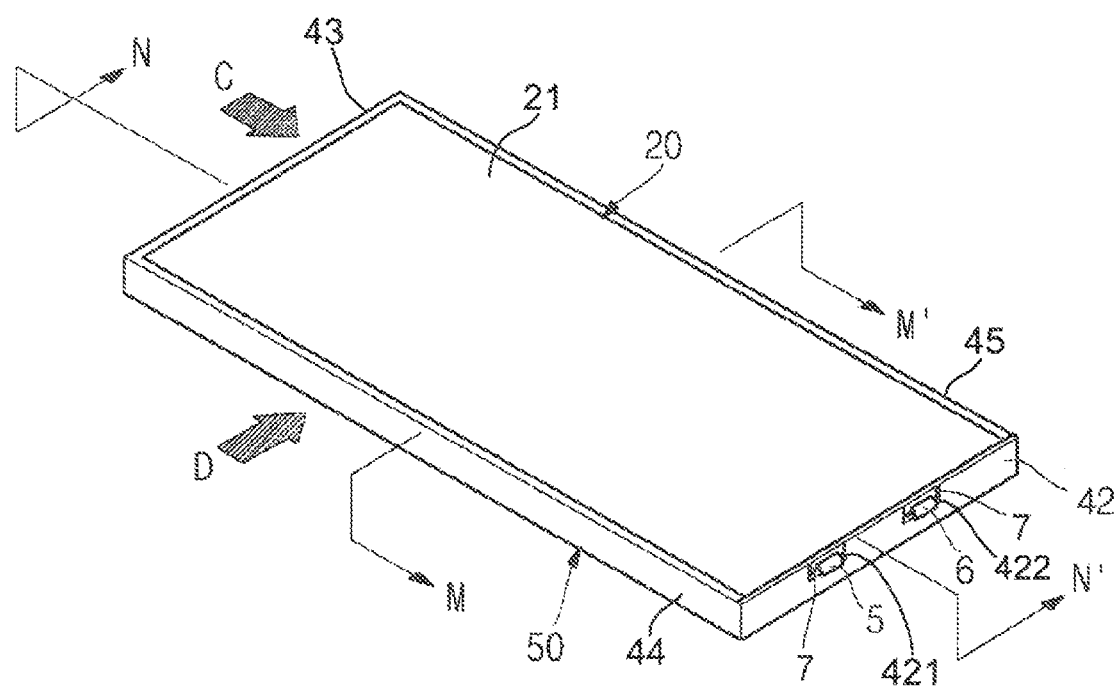
FIG. 7A is a perspective view illustrating a state in which a cover plate, a bare cell and a lower case of the battery pack shown in FIG. 1 are assembled.
Figure 7B:
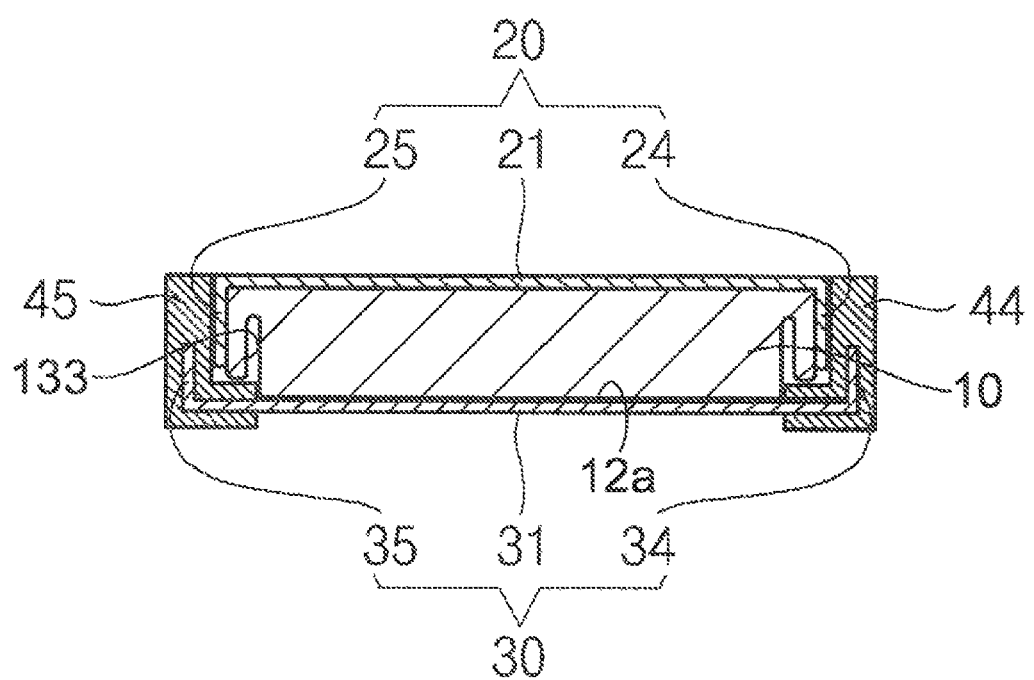
FIG. 7B is a cross-sectional view taken along the line M-M' of FIG. 7A, viewed in a 'C' direction.
Figure 7C:
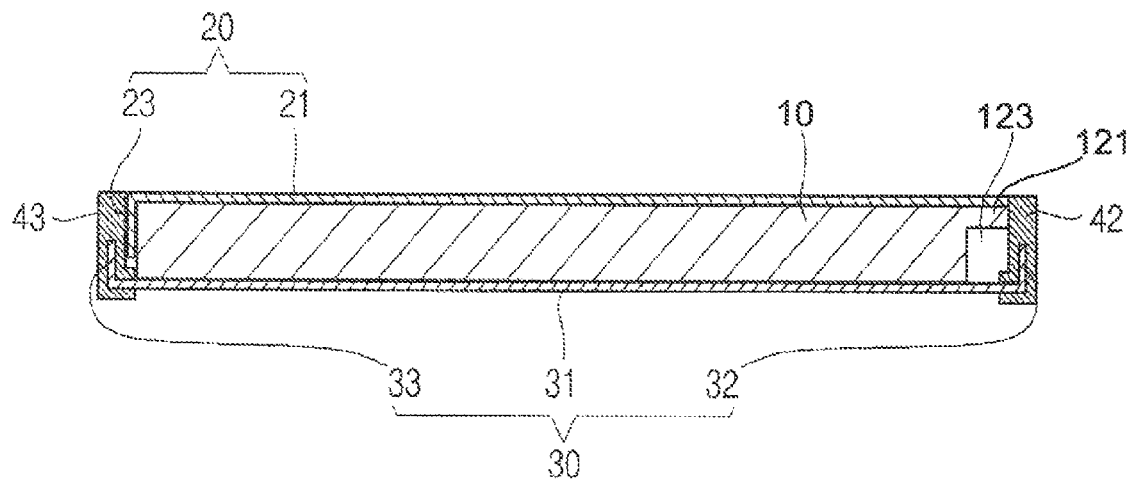
FIG. 7C is a cross-sectional view taken along the line N-N' of FIG. 7A, viewed in a 'D' direction.

FIG. 7A is a perspective view illustrating a state in which a cover plate, a bare cell and an external case of the battery pack shown in FIG. 1 are assembled, FIG. 7B is a cross-sectional view taken along the line M-M' of FIG. 7A, viewed in a 'C' direction, FIG. 7C is a cross-sectional view taken along the line N-N' of FIG. 7A, viewed in a 'D' direction.

Referring to FIGS. 7A to 7C, the bare cell 10 having the cover plate 20 attached thereto is accommodated in the external case 50. Thus, a bottom surface of a receiving part 12a of the bare cell 10, that is, a second long side surface, is attached to the first plate 31 of the reinforcement plate 30. The second long side surface of the bare cell 10 and the first plate 31 are combined with each other to a double sided tape (not shown).

An inner surface of the first resin portion 42 of the external case 50 faces the top surface of the bare cell 10, and the positive electrode tab 5 and the negative electrode tab 6 are drawn out through the positive electrode tab groove 421 and the negative electrode tab groove 422 formed in the first resin portion 42. In addition, an inner surface of the second resin portion 43 closely contacts the second cover portion 23 of the cover plate 20. Further, inner surfaces of the third resin portion 44 and the fourth resin portion 45 of the external case 50 closely contact the third cover portion 24 and the fourth cover portion 25 of the cover plate 20, respectively.

When the bare cell 10 having the cover plate 20 attached thereto is inserted into the external case 50, the first cover portion 21 of the cover plate 20 may be formed to the same height as a thickness wise top end/edge of the resin portion 40 of the external case 50. That is to say, the first cover portion 21 is coplanarly formed with the top surface of the resin portion 40, which is because a label (not shown) wrapping a lateral periphery of the battery pack 100 may easily tear when the first cover portion 21 is formed to be higher or lower than the top surface of the resin portion 40.

As described above, the battery pack 100 according to the embodiment of the present invention can enhance the strength of the external case 50 by attaching the cover plate 20 made of a metal to the outer surface of the bare cell 10.

In addition, the battery pack 100 can enhance the strength of the external case 50 by incorporating the external case 50 with the resin portion 40 by insert molding the reinforcement plate 30 made of a metal. In this case, the strength against distortion or twist can be further enhanced, compared to a case where a reinforcement plate is attached to the outer surface of an external case made of a resin. In addition, the external case 50 is configured such that its strength reinforcing effect can be further increased with a wide, thin type battery pack that is vulnerable to deformation or twist, that is, a battery pack having a wide long side surface and a small thickness.

In addition, in the battery pack 100 according to the embodiment of the present invention, since the bare cell 10 having the cover plate 20 attached thereto is inserted into the external case 50, the volume of the battery pack 100 can be minimized, and an assembling process is simplified, thereby improving the manufacturability.

Next, an external case 50a of a battery pack according to another embodiment of the present invention will be described with reference to FIGS. 8A and 8B.

Figure 8A:
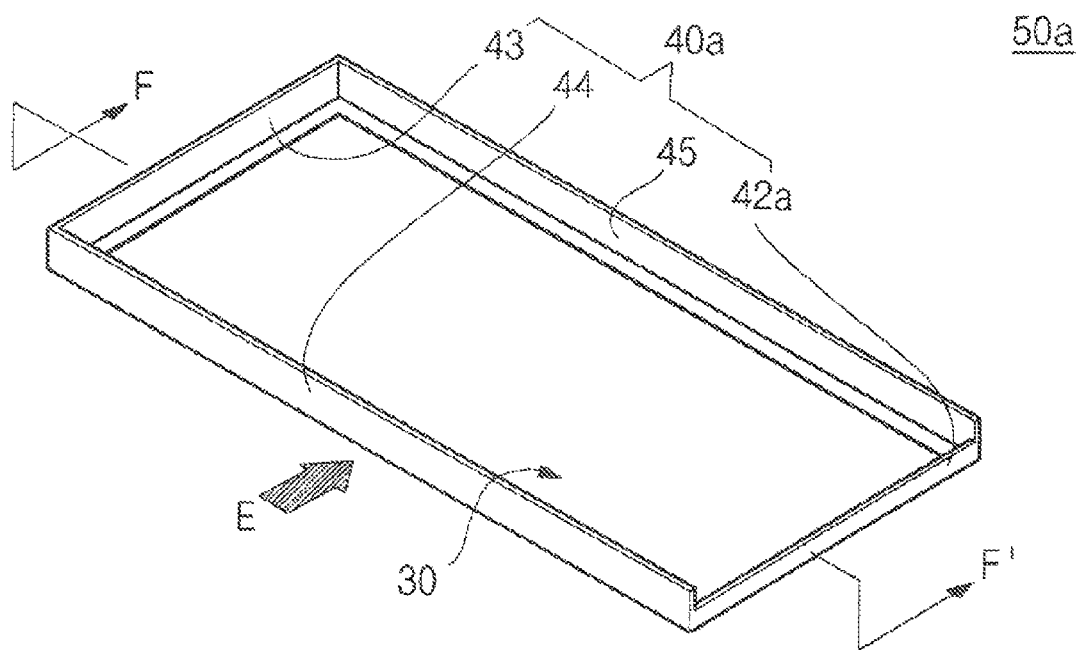
FIG. 8A is a perspective view illustrating a lower case of a battery pack according to another embodiment of the present invention.
Figure 8B:
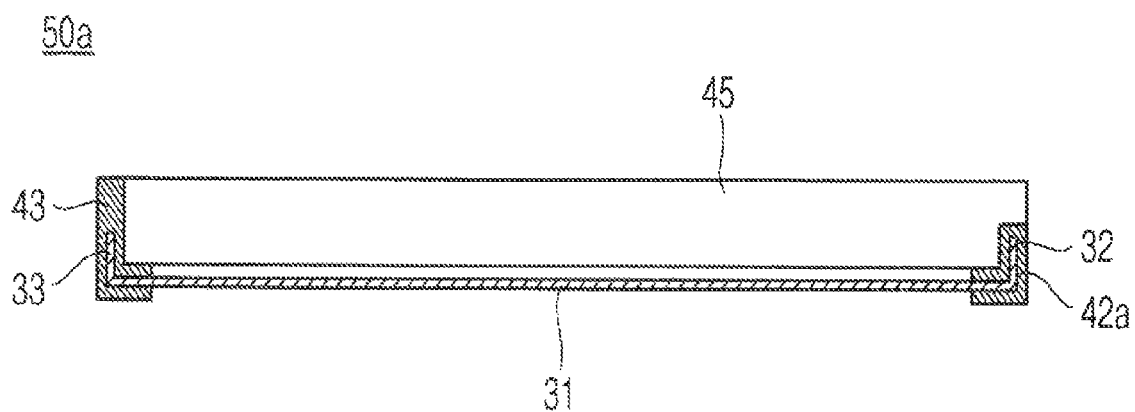
FIG. 8B is a cross-sectional view taken along the line F-F' of FIG. 8A, viewed in an 'E' direction.

FIG. 8A is a perspective view illustrating a lower case of a battery pack according to another embodiment of the present invention, and FIG. 8B is a cross-sectional view taken along the line F-F' of FIG. 8A, viewed in an 'E' direction.

Referring to FIGS. 8A and 8B, the external case 50a of the battery pack according to the embodiment of the present invention includes a reinforcement plate 30 and a resin portion 40a surrounding sidewalls of the reinforcement plate 30. In addition, the resin portion 40a includes a first resin portion 42a, a second resin portion 43, a third resin portion 44 and a fourth resin portion 45. The external case 50a is substantially the same as the external case 50 according to the previous embodiment in view of configuration and operation, except for a configuration of the first resin portion 42a of the resin portion 40a, from which electrode tabs 5 and 6 are drawn out. Thus, the following description will focus on the configuration and operation of the first resin portion 42a, and repeated descriptions of the other components of the external case 50a will be omitted.

The first resin portion 42a is formed to be lower than the first resin portion 42, instead of forming electrode tab grooves 421 and 422. That is to say, the first resin portion 42a is formed to be lower than the second resin portion 43, the third resin portion 44 and the fourth resin portion 45. Thus, when the bare cell 10 is accommodated in the external case 50a, a space in which the electrode tabs 5 and 6 are drawn out is formed between a top end of the first resin portion 42a and a first extending portion 121 (see FIG. 4) of an insulating case 11.

Therefore, the battery pack according to the embodiment of the present invention can facilitate dissipation of internal heat of the battery pack, compared to the battery pack according to the previous embodiment. In addition, the battery pack according to the embodiment of the present invention can further increase the freedom in view of the location of the electrode assembly 1, from which the electrode tabs 5 and 6 are drawn out, compared to the battery pack according to the previous embodiment.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A battery pack comprising:
    a bare cell;
    a cover plate attached to one of long side surfaces that are widest planes of the bare cell; and
    an external case including a resin portion and a metal reinforcement plate and accommodating the bare cell, wherein the resin portion surrounds sides of the metal reinforcement plate;
    the cover plate consisting of:
        a first cover portion attached to the one long side surface of the bare cell exposed to a top opening of the external case;
        a second cover portion attached to a bottom surface of the bare cell;
        a third cover portion attached to one short side surface of the bare cell; and a fourth cover portion attached to an opposite short side surface of the bare cell and facing the one short side surface of the bare cell, wherein the second cover portion, the third cover portion and the fourth cover portion of the cover plate are disposed inside the external case, the metal reinforcement plate being attached to the other of long side surfaces that are widest planes of the bare cell.

2. The battery pack of claim 1, wherein the cover plate and the bare cell are combined with each other using a double sided tape.

3. The battery pack of claim 1, wherein the cover plate is made of a metal.

4. The battery pack of claim 1, wherein the metal reinforcement plate and the bare cell are combined with each other using a double sided tape.

5. The battery pack of claim 1, wherein the metal reinforcement plate comprises:
   a first metal plate covering an opposite long side surface of the bare cell and facing the one long side surface;
   a second metal plate facing a top surface of the bare cell;
   a third metal plate facing a bottom surface of the bare cell;
   a fourth metal plate facing one short side surface of the bare cell; and
   a fifth metal plate facing an opposite short side surface of the bare cell and facing the one short side surface of the bare cell.

6. The battery pack of claim 5, wherein the resin portion comprises:
   a first resin portion surrounding the second metal plate;
   a second resin portion surrounding the third metal plate;
   a third resin portion surrounding the fourth metal plate; and
   a fourth resin portion surrounding the fifth metal plate,
   wherein the first metal plate is exposed to the outside of the resin portion.

7. The battery pack of claim 6, wherein the bare cell comprises an electrode assembly and an insulating case accommodating the electrode assembly, the electrode assembly having a positive electrode tab and a negative electrode tab, and the first resin portion includes a positive electrode tab groove and a negative electrode tab groove formed to be spaced apart from each other to allow the positive electrode tab and the negative electrode tab to be drawn out to the outside of the external case.

8. The battery pack of claim 6, wherein the bare cell comprises an electrode assembly and an insulating case accommodating the electrode assembly, the electrode assembly having a positive electrode tab and a negative electrode tab, the insulating case includes a first extending portion from which the positive electrode tab and the negative electrode tab are drawn out, a height of the first resin portion is smaller than heights of the second resin portion, the third resin portion and the fourth resin portion, and the positive electrode tab and the negative electrode tab are drawn out to a space formed between the first extending portion and a top end of the first resin portion.

9. The battery pack of claim 1, wherein the first cover portion is coplanar with a top surface of the resin portion.

10. A battery pack comprising:
    a cover plate consisting of a wide planer surface and three sidewalls extending vertically from the wide planer surface;
    a bare cell, the wide planer surface of the cover plate being attached to the bare cell; and
    an external case accommodating the bare cell, the external case including a resin portion and a metal reinforcement plate, the metal reinforcement plate having a wide planer surface and four metal sidewalls extending vertically from the wide planer surface, the resin portion surrounding the four metal sidewalls of the metal reinforcement plate leaving the wide planer surface of the metal reinforcement plate exposed, wherein the three sidewalls of the cover plate are attached to the bare cell and disposed inside the external case, the wide planer surface of the metal reinforcement plate being attached to the bare cell.

11. The battery pack of claim 10, wherein the metal reinforcement plate and the bare cell are attached to each other using a double sided tape.

12. The battery pack of claim 10, wherein the bare cell comprises an electrode assembly and an insulating case accommodating the electrode assembly, the electrode assembly having a positive electrode tab and a negative electrode tab, the external case having one sidewall including a positive electrode tab groove and a negative electrode tab groove formed in the resin portion and spaced apart from each other, the positive electrode tab and the negative electrode tab extending through the positive electrode tab groove and the negative electrode tab groove to the outside of the external case.

13. The battery pack of claim 10, wherein the cover plate is made of a metal.

14. The battery pack of claim 10, the resin portion comprising four sidewalls, each of the four sidewalls of the resin portion enclosing respective ones of the four metal sidewalls of the metal reinforcement plate, a height of the four metal sidewalls of the metal reinforcement plate being shorter than a height of the four sidewalls of the resin portion and a thickness of the battery pack being equal to a height of at least three of the four sidewalls of the resin portion.

15. The battery pack of claim 14, the height of one of the four sidewalls of the resin portion being shorter than the height of the remaining three sidewalls of the resin portion.

16. The battery pack of claim 15, wherein the bare cell comprises an electrode assembly and an insulating case accommodating the electrode assembly, the electrode assembly having a positive electrode tab and a negative electrode tab extending through the insulating case and over the one sidewall of the resin portion having the shorter height to the outside of the external case.

* * * * *